(12) United States Patent
Hirayama et al.

(10) Patent No.: US 6,637,201 B2
(45) Date of Patent: Oct. 28, 2003

(54) MASTER CYLINDER

(75) Inventors: Junichi Hirayama, Higashimatsuyama (JP); Kunihiro Chiba, Higashimatsuyama (JP); Shusaku Chiba, Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 149 days.

(21) Appl. No.: 10/037,963

(22) Filed: Nov. 7, 2001

(65) Prior Publication Data

US 2003/0084665 A1 May 8, 2003

(51) Int. Cl.[7] ................................................. B60T 11/26
(52) U.S. Cl. ........................................................ 60/585
(58) Field of Search ..................................... 60/585, 587

(56) References Cited

U.S. PATENT DOCUMENTS

| 2,112,356 | A | * | 3/1938 | Bock ............................. 60/586 |
| 2,580,851 | A | * | 1/1952 | Seppmann ..................... 60/585 |
| 4,373,333 | A | * | 2/1983 | Coleman ....................... 60/578 |
| 4,694,651 | A | * | 9/1987 | Yardley et al. ............... 60/578 |
| 4,736,768 | A | * | 4/1988 | Tsubouchi et al. .......... 137/514 |
| 4,773,224 | A |   | 9/1988 | Sakamoto et al. |
| 4,860,541 | A | * | 8/1989 | Steer ............................. 60/578 |
| 5,720,170 | A | * | 2/1998 | Hageman et al. ............. 60/562 |
| 6,438,955 | B1 | * | 8/2002 | Chiba et al. ................... 60/578 |

FOREIGN PATENT DOCUMENTS

| JP | 09-290718 A | 11/1997 |
| JP | 10-53120 A | 2/1998 |

* cited by examiner

*Primary Examiner*—Edward K. Look
*Assistant Examiner*—Igor Kershteyn
(74) *Attorney, Agent, or Firm*—Alston & Bird LLP

(57) ABSTRACT

A throttle valve mechanism having a throttle function of throttling the flow of working fluid from a pressure delivering chamber to a reservoir at the operation time of the piston of a master cylinder, a valve function of allowing the working fluid to flow from the reservoir to the pressure delivering chamber by opening the valve at the return time of the piston, and a relief valve function of allowing a large quantity of working fluid to flow from the pressure delivering chamber to the reservoir is disposed in a fluid passage for connecting the master cylinder to the reservoir. The master cylinder can decrease the quantity of working fluid flowing to the reservoir at the time of operation start of the master cylinder, and can respond to the fluctuations in fluid pressure quickly when a traction control unit, an automobile stability control unit, etc. are released.

5 Claims, 10 Drawing Sheets

MASTER CYLINDER

FIELD OF THE INVENTION AND RELATED ART

The present invention relates to a master cylinder. More particularly, it relates to a master cylinder that is suited for an automobile on which a working fluid is returned from a wheel cylinder to a reservoir through a working fluid passage for the master cylinder when brake control is released on an automobile provided with a unit in which a working fluid for the wheel cylinder is pressurized by pumping-up to carry out brake control (traction control unit, automobile stability control unit, etc.), and that decreases the noneffective piston stroke of the master cylinder at the time of ordinary operation.

FIG. 20 is a sectional view showing one example of a conventional master cylinder, which has been disclosed in Japanese Patent Application Provisional Publication No. 10-53120 (No. 53120/1998). This master cylinder 1 has a piston 3 fitted slidably in a cylinder bore 2a formed in a cylinder body 2, and is provided with a pressure delivering chamber 4 defined by the piston 3 and a supply passage 5. The piston 3 is fitted with a valve mechanism 6 and a floating throttle valve mechanism 7 on the extension of the axial line. The valve mechanism 6 opens an axial hole 12 with a flange 10 integral with a rod 9 being separated from an annular member 11 in response to the retreat of the piston 3 to the return position effected by a return spring 8 installed in the pressure delivering chamber 4, and closes the axial hole 12 with the flange 10 coming into contact with the annular member 11 in response to the advance of the piston from the return position.

Also, the floating throttle valve mechanism 7, which is provided with a floating member 13 having a throttle hole 13a, moves the floating member 13 to a throttling position at which a throttle effect is given to the flow of a working fluid when the working fluid flows toward a reservoir, not shown, and moves the floating member 13 to a non-throttling position at which no throttle effect is given to the flow of the working fluid when the working fluid flows from the reservoir toward the pressure delivering chamber 4 through the axial hole 12.

The piston 3 begins to operate in the state in which the valve mechanism 6 is open, and advances in the left-hand direction in the figure, whereby the valve mechanism 6 is closed. Therefore, the communication between the pressure delivering chamber 4 and the supply passage 5 is cut off. Subsequently, by moving the piston 3 further in the left-hand direction, a pressure is delivered in the pressure delivering chamber 4, and the working fluid is discharged through an output port 14. During the time elapsing from when the piston 3 begins to advance to when the valve mechanism 6 closes, the working fluid in the pressure delivering chamber 4 is made to flow by the advance of the piston 3 so as to go into the supply passage 5 through the floating throttle valve mechanism 7 and the valve mechanism 6. At this time, by the flow of the working fluid, the floating member 13 of the floating throttle valve mechanism 7 closes a communication hole 15a in a case 15. Thereby, the working fluid in the pressure delivering chamber 4 is made to flow into the supply passage 5 through the throttle hole 13a in the floating member 13. The quantity of working fluid flowing from the pressure delivering chamber 4 into the supply passage 5 decreases as compared with the case where the flow of working fluid from the pressure delivering chamber 4 to the supply passage 5 is not throttled.

However, for a master cylinder used for an automobile provided with a traction control unit and an automobile stability control unit, in the case where there is provided a throttle valve mechanism (for example, an orifice) for decreasing the quantity of working fluid flowing from the pressure delivering chamber 4 to the reservoir at the time of operation start (at the time of piston advance), there arises a problem in that a delay in returning fluid to the reservoir or a delay in lowering the fluid pressure in the pressure delivering chamber 4 is encountered because of the interposition of the throttle valve mechanism in the passage when the working fluid is returned from the wheel cylinder to the reservoir via a make-up liquid passage of the master cylinder at the time when the traction control unit and the automobile stability control unit are released.

Also, in the case where the throttle valve mechanism is provided in a portion in which the master cylinder and the reservoir are connected to each other, when liquid is returned from the pressure delivering chamber to the reservoir, there arises a problem in that a high pressure is delivered in a portion in which the master cylinder and the reservoir are connected to each other, and a force acts in the direction toward the reservoir tank, so that the cost is increased by the increased strength of a tank holding construction.

For these reasons, there has been demanded a master cylinder having a construction in which the throttle valve mechanism can respond quickly to an increase/decrease in the quantity of the returned working fluid (that is, a change in pressure) at the time when the traction control unit and the automobile stability control unit are released.

OBJECT AND SUMMARY OF THE INVENTION

The present invention has been made in view of the above situation, and accordingly an object thereof is to provide a master cylinder for an automobile provided with a traction control unit and an automobile stability control unit, which has a simple and small valve construction which can decrease the quantity of working fluid flowing to a reservoir at the time of operation start of master cylinder, and can respond to the fluctuations in fluid pressure quickly when the traction control unit and the automobile stability control unit are released, and which is capable of decreasing the noneffective piston stroke.

To achieve the above object, the present invention is configured as follows in a master cylinder in which a piston is disposed slidably in a cylinder bore formed in a cylinder body; a pressure delivering chamber is defined by the piston and the cylinder body; a fluid passage, which connects the pressure delivering chamber to a reservoir, for resupply the working fluid to the pressure delivering chamber is provided; and a working fluid whose pressure is increased in the pressure delivering chamber is discharged through an output port at the operation time of the piston.

A throttle valve mechanism having a throttle function of throttling the flow of working fluid from the pressure delivering chamber to the reservoir at the operation time of the piston, a valve function of allowing the working fluid to flow from the reservoir to the pressure delivering chamber by opening the valve at the return time of the piston, and a relief valve function of allowing the working fluid to flow from the pressure delivering chamber to the reservoir is disposed in the fluid passage.

The throttle valve mechanism has a valve seat provided at the tip end of a connector of the reservoir with the cylinder body, and a floating valve disc formed of an elastic material formed with a throttle hole and a plurality of slits in a substantially central portion thereof, which has a valve seat face which is seated against the valve seat.

Alternatively, the throttle valve mechanism has a thin-sheet or thin-film valve sheet formed of an elastic material, a rib formed at the tip end of the connector of the reservoir with the cylinder body, with which the valve sheet comes into contact from the pressure delivering chamber side, and a fixing portion for fixing the valve sheet, and in the normal state in which the valve sheet is not deformed, a slit for throttling is formed between the outer peripheral edge of the valve sheet and the inner peripheral face of tip end of the connector of the reservoir.

Alternatively, the throttle valve mechanism has two large-diameter and small-diameter thin-sheet or thin film valve sheets, each formed of an elastic material, a rib formed at the tip end of the connector of the reservoir with the cylinder body, with which the large-diameter valve sheet comes into contact from the pressure delivering chamber side with the small-diameter valve sheet being interposed between the rib and the large-diameter valve sheet, and a fixing portion for fixing both of the valve sheets in a substantially central portion of the rib; a through hole is formed in a portion in which the small-diameter valve sheet laps over the large-diameter valve sheet; and in the normal state in which the large-diameter valve sheet is not deformed, a slit for throttling is formed between the outer peripheral edge of the large-diameter valve sheet and the inner peripheral face of tip end of the connector of the reservoir.

Alternatively, the throttle valve mechanism has a floating valve disc formed of an elastic material formed with a throttle hole, and a sheet face formed on the inner peripheral face of a valve chest, which is a passage between the tip end of the connector of the reservoir with the cylinder body and the cylinder body side of the connector, so as to be inclined with respect to the valve axis, the connector having a through groove in the tip end thereof and being formed with a valve seat with which the floating valve disc floating in the valve axis direction comes into contact, so that when the floating valve disc moves toward the reservoir, the valve is closed, and when the floating valve disc moves toward the cylinder body, the valve is opened.

Since the present invention is configured as described above, when the working fluid flows from the pressure delivering chamber to the reservoir at the time of operation start of the piston of master cylinder, the working fluid flows through the throttle mechanism only, so that the quantity of working fluid flowing to the reservoir is decreased.

Inversely, when the working fluid flows from the reservoir to the pressure delivering chamber at the return time of the piston, including the operation time of the traction control unit (or the automobile stability control unit) of automobile, a check valve mechanism is opened by the flow of the working fluid, so that the working fluid flows mainly through the check valve mechanism.

Also, when a large quantity of high-pressure working fluid flows from the pressure delivering chamber to the reservoir at the release time of the traction control unit (or the automobile stability control unit) of automobile, a relief valve mechanism is opened by the great flow of working fluid, so that the working fluid flows through the relief valve mechanism. Therefore, the throttle valve mechanism responds quickly to the fluctuations in fluid pressure. At the same time, the above-described mechanism can decrease the noneffective piston stroke of master cylinder.

DETAILED DESCRIPTION OF PREFERRED EMBODIMENTS

Preferred embodiments of the present invention will now be described in detail with reference to the accompanying drawings.

Figure 1:
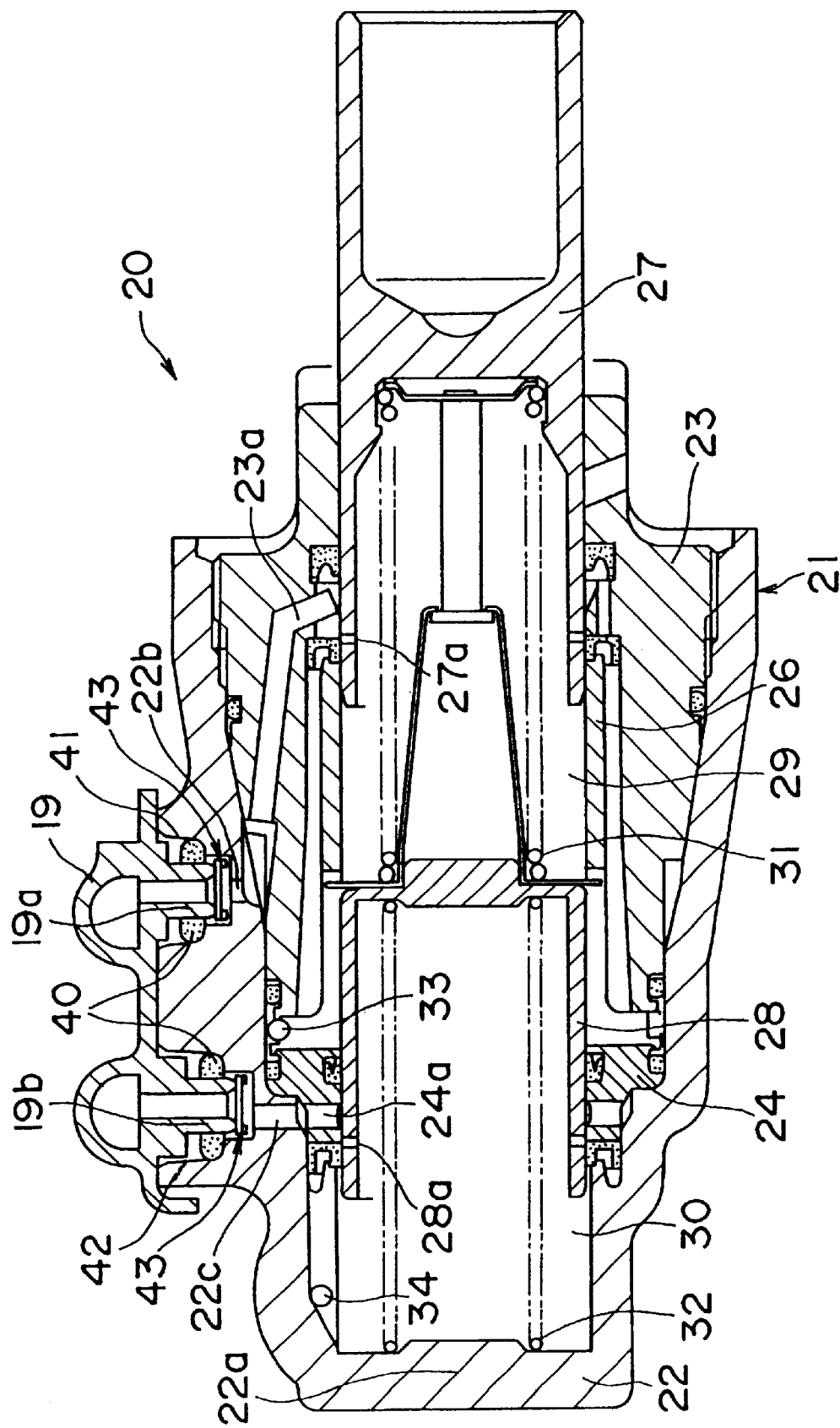
FIG. 1 is a longitudinal sectional view showing a first embodiment of a master cylinder in accordance with the present invention.
Figure 2:
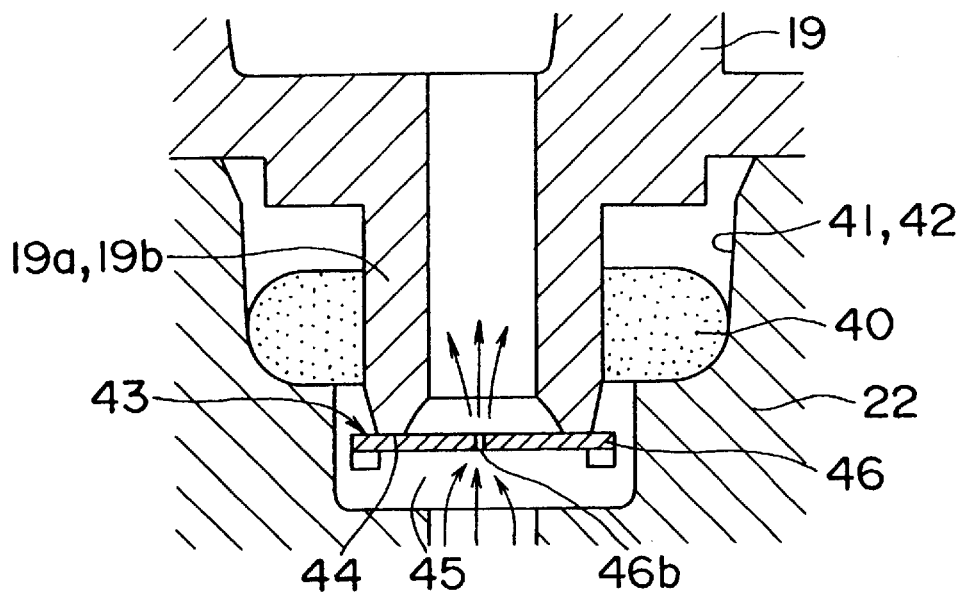
FIG. 2 is an enlarged sectional view showing a valve closing state of a throttle valve mechanism provided in a portion in which a cylinder body and a reservoir are connected to each other in the master cylinder shown in FIG. 1.
Figure 3:
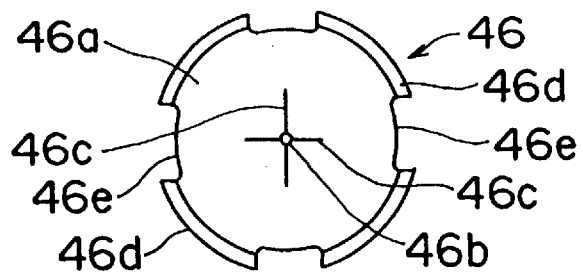
FIG. 3 is a bottom view of a floating valve disc of the throttle valve mechanism shown in FIG. 2.
Figure 4:
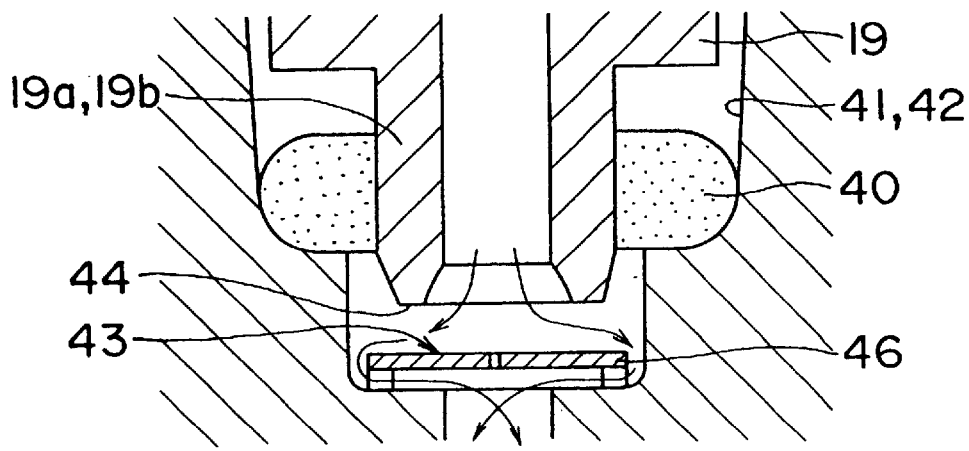
FIG. 4 is a sectional view showing a valve opening state of the throttle valve mechanism shown in FIG. 2.
Figure 5:
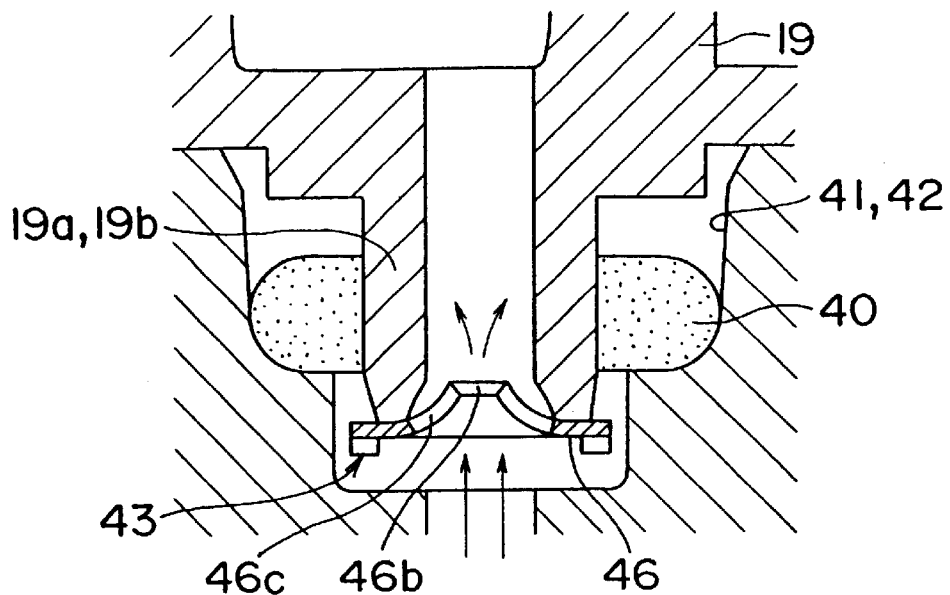
FIG. 5 is a sectional view showing a state in which a valve is opened by a working fluid in the throttle valve mechanism shown in FIG. 2.

FIGS. 1 to 5 show a first embodiment of a master cylinder in accordance with the present invention. FIG. 1 is a longitudinal sectional view of the master cylinder, FIG. 2 is an enlarged sectional view showing a valve closing state of a throttle valve mechanism provided in a portion in which a cylinder body and a reservoir are connected to each other, and FIG. 3 is a bottom view of a floating valve disc of the throttle valve mechanism shown in FIG. 2. FIG. 4 is a sectional view showing a valve opening state of the throttle valve mechanism, and FIG. 5 is a sectional view showing a state in which a valve is opened by a working fluid in the throttle valve mechanism. The throttle valve mechanism shown in this embodiment can be used for both a center valve type master cylinder and a plunger type master cylinder.

Referring to FIG. 1, a cylinder body 21 of this master cylinder 20 is made up of a cylinder element 22 and a cap 23 assembled to the cylinder element 22. The cylinder element 22 is provided with a reservoir 19 and two connector receiving portions 41 and 42, and the cap 23 is provided with an inclined fluid passage 23a in the peripheral wall thereof. A piston guide 24 is fitted in the cylinder element 22, and a sleeve 26 is fitted in the cap 23.

In the master cylinder 20, a primary piston 27 is engaged slidably with the flanged sleeve 26, and a secondary piston 28 is engaged slidably with the piston guide 24 and the sleeve 26. A primary pressure chamber 29 and a secondary pressure chamber 30 are defined by both of the pistons 27 and 28.

The primary piston 27 and the secondary piston 28 each have a bottomed cylindrical shape, and are formed with small holes 27a and 28a, respectively, in the peripheral wall thereof. Also, the pistons 27 and 28 are urged in the return direction (the direction toward inoperative position, that is, the right-hand direction in the figure) by a return spring 31 disposed between the pistons 27 and 28 and by a return spring 32 disposed between the piston 28 and an end wall 22a of the cylinder element 22, respectively.

The primary pressure chamber 29 can communicate with one connector receiving portion 41 through the small hole 27a formed in the primary piston 27, the fluid passage 23a provided in the cap 23, and a fluid passage 22b in the cylinder element 22. Also, the secondary pressure chamber 30 can communicate with the other connector receiving portion 42 through the small hole 28a formed in the secondary piston 28, a fluid passage 24a provided in the piston guide 24, and a fluid passage 22c in the cylinder element 22. The pressure chambers 29 and 30 can communicate with wheel cylinders for front and rear wheels, not shown, via output ports 33 and 34 formed in the cylinder element 22, respectively.

In the connector receiving portions 41 and 42, connectors 19a and 19b of the reservoir 19 are fitted, respectively, via a sealing member 40, and floating throttle valve mechanisms 43, 43, each of which is a kind of throttle valve mechanism, are disposed in fluid passages in the connectors (fluid passages connecting the pressure chambers 29 and 30 to the reservoir 19).

As shown in FIGS. 2 and 4, each of the floating throttle valve mechanisms 43, 43 disposed in the fluid passages in the connectors 19a and 19b has a valve seat 44 formed at the tip end of the connector 19a, 19b of the reservoir 19 and a valve chest 45 defined in the connector receiving portion 41, 42 by the connector 19a, 19b, and is configured so as to house a floating valve disc 46 in the valve chest 45.

The floating valve disc 46 is formed of an elastic material, for example, a synthetic resin material, having a valve seat face which is seated against the valve seat 44. As shown in FIG. 3, the floating valve disc 46 has a disc-shaped valve element 46a, in which a throttle hole 46b is formed in the center thereof and a plurality of, for example, two cross-shaped slits 46c are formed as an elastic deformation portion with the throttle hole 46b being the center, and four ribs 46d formed downward at equal angular intervals along the outer periphery of the disc-shaped valve element 46a, and also has notch-shaped fluid passages (makeup fluid passages) 46e, 46e formed between the adjacent ribs 46d, 46d. In place of the notch-shaped fluid passages 46e, 46e, a plurality of grooves may be formed in the cylinder body 21 side.

Usually, the floating throttle valve mechanism 43 is disposed in the fluid passage in each of the connector receiving portions 41 and 42 of the cylinder body 21 of the master cylinder 20, in which the connectors 19a and 19b of the reservoir 19 are fitted, respectively. However, the configuration is not limited to this if the floating throttle valve mechanism 43 is disposed in a working fluid resupply passage running from the pressure delivering chambers 29 and 30 to the reservoir 19.

At the time of operation start of the master cylinder 20, when a working fluid flows from the downside to the upside in FIG. 2, that is, from the compression chamber 29, 30 to the reservoir 19, the floating valve disc 46 is made to float by the flow of working fluid and comes into contact with the valve seat 44, the floating throttle valve mechanism 43 becoming in a valve closed state, so that the working fluid flows upward through the throttle hole 46b only. Therefore, at the time of operation start, the quantity of working fluid flowing from the pressure chamber 29, 30 to the reservoir 19 can be decreased.

Inversely, when the working fluid flows from the upside to the downside as shown in FIG. 4, that is, from the reservoir 19 to the pressure chamber 29, 30, the floating valve disc 46 is lowered by the flow of working fluid and the gravity and thus separates from the valve seat 44, the floating throttle valve mechanism 43 becoming in a valve opening state, so that the working fluid in the reservoir 19 flows downward to the pressure chamber 29, 30 passing through a space between the valve seat 44 and the floating valve disc 46 and through the fluid passages 46e at the outer periphery of the floating valve disc 46. Therefore, when the master cylinder 20 returns, the working fluid in the reservoir 19 can be resupplied to the pressure chamber 29, 30 without resistance (with small resistance).

As shown in FIG. 5, when the quantity of working fluid returned from the downside to the upside, that is, from the pressure chamber 29, 30 of the master cylinder 20 to the reservoir 19 is large as in the case where a traction control unit, an automobile stability control unit, etc. are released, although the floating throttle valve mechanism 43 is made in a valve closing state as described above by the great flow of the working fluid, the slits 46c in the floating valve disc 46 are elastically deformed by the pressing force of the flow of working fluid so as to be expanded toward the reservoir 19, so that the working fluid flows upward while expanding the passage. Therefore, the working fluid is returned to the reservoir 19 without resistance (with small resistance).

The floating valve disc 46 may be configured so that a small urging force is applied upward by a compression spring.

The operation of the master cylinder 20 in the first embodiment will be described in respect of the primary side, and a description of the secondary side that operates in the same way as the primary side is omitted.

In an inoperative state shown in FIG. 1, the piston 27 is positioned at the right end by the urging force of the spring 31, and the floating throttle valve mechanism 43 is in a valve opening state. When the piston 27 operates and advances in the left-hand direction from this state, the pressure in the compression chamber 29 increases, and thus the working fluid is sent out through the output port 33. Until the small hole 27a in the piston 27 is closed, the working fluid in the pressure chamber 29 is made to flow into the valve chest 45 of the floating throttle valve mechanism 43 by the advance of the piston 27. At this time, the floating valve disc 46 of the floating throttle valve mechanism 43 is made to float by the flow of working fluid and is brought into contact with the valve seat 44. By this contact, the working fluid in the pressure chamber 29 is returned to the reservoir 19 through the throttle hole 46b only. However, the quantity of the returned working fluid is very small.

When the operation of the piston 27 is released, the piston 27 is retreated by the urging force of the spring 31, so that the pressure in the pressure chamber 29 decreases, becoming a negative pressure, and the small hole 27a is opened, whereby the pressure chamber 29 is made to communicate with the reservoir 19. At this time, the floating valve disc 46 of the floating throttle valve mechanism 43 separates from the valve seat 44, and thus the working fluid flows from the reservoir 19 to the pressure chamber 29 with small resistance only and is resupplied.

Next, when the traction control unit and the automobile stability control unit, which are provided on the automobile, are released, the working fluid is suddenly returned to the pressure chamber 29. When a brake pedal is depressed, the piston 27 retreats, the small hole 27a being opened, so that the pressure chamber 29 communicates with the reservoir 19. At this time, a great flow of working fluid takes place from the pressure chamber 29 to the reservoir 19. Although the floating throttle valve mechanism 43 is made in a valve closing state as described above by this flow, the pressing force due to the flow of working fluid expands the slits 46c in the floating valve disc 46, so that a large quantity of working fluid is returned to the reservoir 19 rapidly.

According to the master cylinder 20 in accordance with the first embodiment of the present invention, even on an automobile provided with a traction control unit and an automobile stability control unit, at the time of operation start of the master cylinder 20, the quantity of working fluid flowing to the reservoir 19 can be decreased by the simple and small floating throttle valve mechanism 43, and also a function of responding quickly to the fluctuations in fluid pressure at the time when the traction control unit and the automobile stability control unit are released can be fulfilled. At the same time, the noneffective piston stroke of the master cylinder 20 can be decreased.

Figure 6:
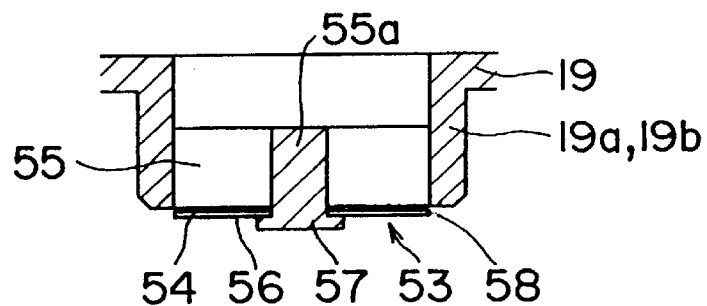
FIG. 6 is an enlarged sectional view showing a valve closing state of a throttle valve mechanism, showing a second embodiment of a master cylinder in accordance with the present invention.
Figure 7:
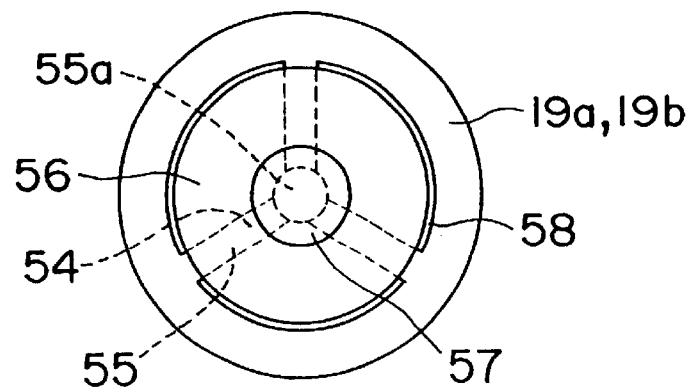
FIG. 7 is a bottom view of the throttle valve mechanism shown in FIG. 6.
Figure 8:
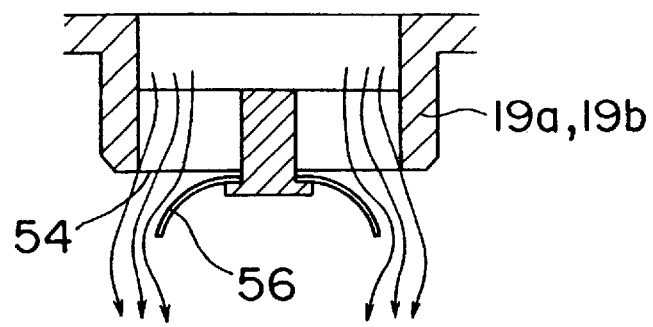
FIG. 8 is a sectional view showing a valve opening state of the throttle valve mechanism shown in FIG. 6.
Figure 9:
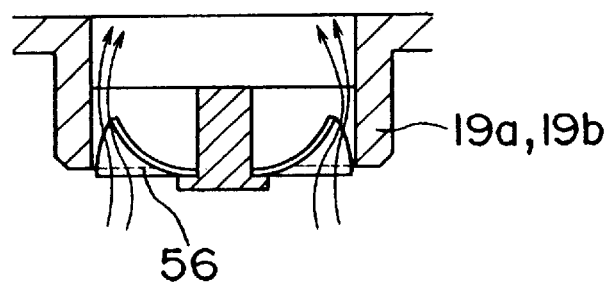
FIG. 9 is a sectional view showing a state in which a valve is opened by a working fluid in the throttle valve mechanism shown in FIG. 6.

FIGS. 6 to 9 show a second embodiment of a master cylinder in accordance with the present invention. In this embodiment, a throttle valve mechanism with valve seat is used in place of the floating throttle valve mechanism 43, serving as a throttle valve mechanism, described in the first embodiment. FIG. 6 is an enlarged sectional view showing a valve closing state of the throttle valve mechanism with valve sheet of the master cylinder, FIG. 7 is a bottom view of the throttle valve mechanism shown in FIG. 6, FIG. 8 is a sectional view showing a valve opening state of the throttle valve mechanism shown in FIG. 6, and FIG. 9 is a sectional view showing a state in which a valve is opened by a working fluid in the throttle valve mechanism shown in FIG. 6. The throttle valve mechanism shown in this embodiment can be used for both a center valve type master cylinder and a plunger type master cylinder.

As shown in FIGS. 6 and 7, this throttle valve mechanism 53 with valve sheet is made up of a thin-sheet or thin-film valve sheet 56 formed of an elastically deformable elastic material, for example, a synthetic resin material, ribs 55 formed at the tip end of the connector 19a, 19b of the reservoir 19 with the cylinder body 21, which forms a valve seat 54 with which the valve sheet 56 comes into contact from the pressure delivering chamber side, and a fixing portion 57 for fixing the central portion of the valve sheet 56 to a central portion 55a of the ribs 55. In the normal state in which the valve sheet 56 is not deformed, slits 58 for throttling are formed between the outer peripheral edge of the valve sheet 56 and the inner peripheral face of tip end of the connector 19a, 19b of the reservoir 19.

Usually, the throttle valve mechanism 53 with valve sheet is disposed in the fluid passage in each of the connector receiving portions 41 and 42 of the cylinder body 21 of the master cylinder 20, in which the connectors 19a and 19b of the reservoir 19 are fitted, respectively. However, the configuration is not limited to this if the throttle valve mechanism 53 is disposed in a working fluid resupply passage running from the pressure delivering chambers 29 and 30 to the reservoir 19.

At the time of operation start of the master cylinder 20, when a working fluid flows from the downside to the upside in FIG. 6, that is, from the compression chamber 29, 30 to the reservoir 19, the valve sheet 56 is brought into contact with the valve seat 54 by the flow of working fluid, so that the working fluid sent from the pressure chamber 29, 30 flows to the reservoir 19 passing through only the slits 58 for throttling formed between the outer peripheral edge of the valve sheet 56 and the inner peripheral face of tip end of the connector 19a, 19b of the reservoir 19. Therefore, the quantity of working fluid flowing from the pressure chamber 29, 30 to the reservoir 19 can be decreased.

Inversely, when the working fluid flows from the upside to the downside as shown in FIG. 8, that is, from the reservoir 19 to the pressure chamber 29, 30, the valve sheet 56 is separated from the valve seat 54 by the flow of working fluid and the gravity, and is elastically deformed toward the pressure chamber 29, 30. On the outside of the valve sheet 56, the working fluid sent from the reservoir 19 flows to the pressure chamber 29, 30 passing through an expanded passage between the valve seat 54 and the valve sheet 56. Therefore, when the master cylinder 20 is returned, the working fluid in the reservoir 19 can be resupplied to the pressure chamber 29, 30 without resistance (with small resistance).

As shown in FIG. 9, when the quantity of working fluid returned from the downside to the upside, that is, from the pressure chamber 29, 30 of the master cylinder 20 to the reservoir 19 is large as in the case where the traction control unit, the automobile stability control unit, etc. are released, the valve sheet 56 is elastically deformed toward the reservoir 19, and thus the passage is expanded. Therefore, the working fluid is returned to the reservoir 19 without resistance (with small resistance).

Figure 10:
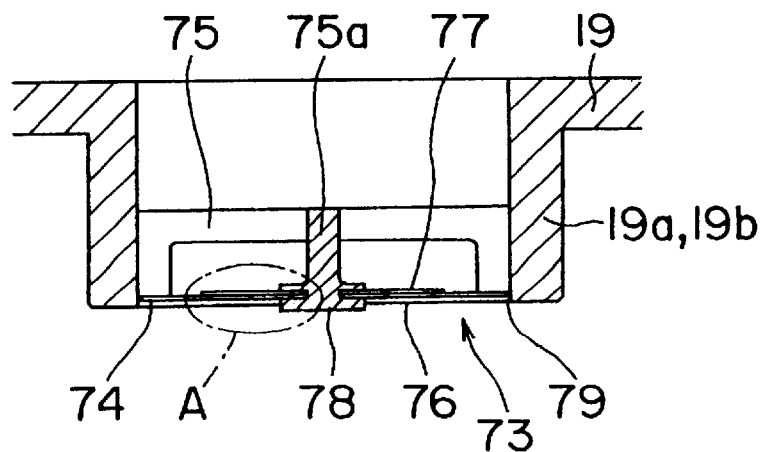
FIG. 10 is an enlarged sectional view showing a valve closing state of a throttle valve mechanism, showing a third embodiment of a master cylinder in accordance with the present invention.
Figure 11:
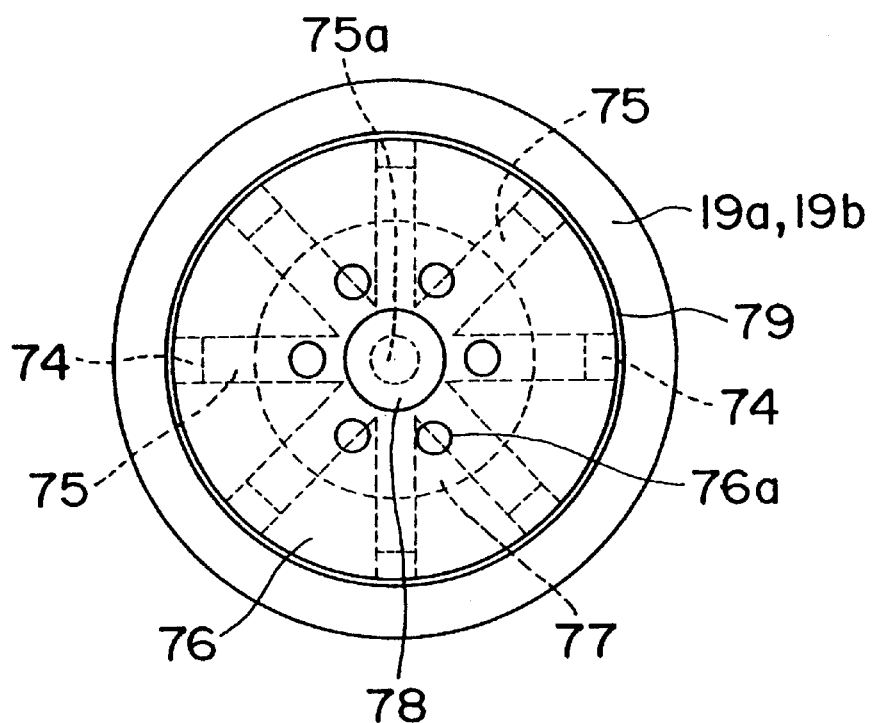
FIG. 11 is a bottom view of the throttle valve mechanism shown in FIG. 10.
Figure 12:
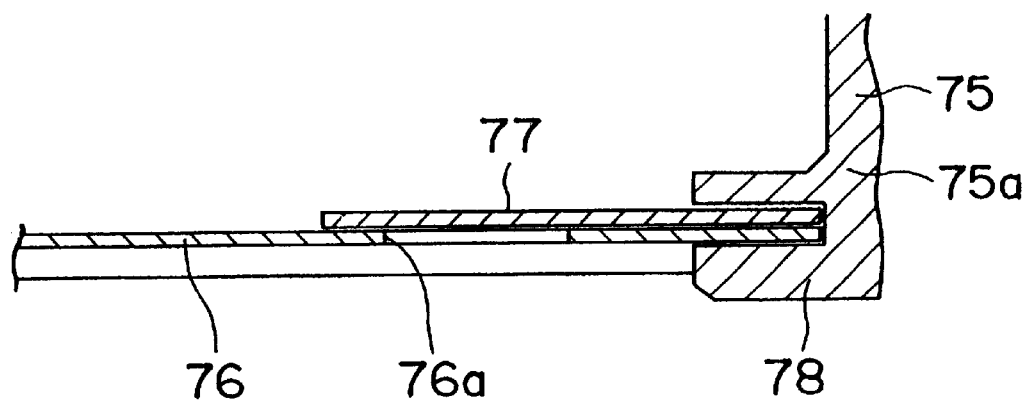
FIG. 12 is an enlarged sectional view of portion A of FIG. 10.
Figure 13:
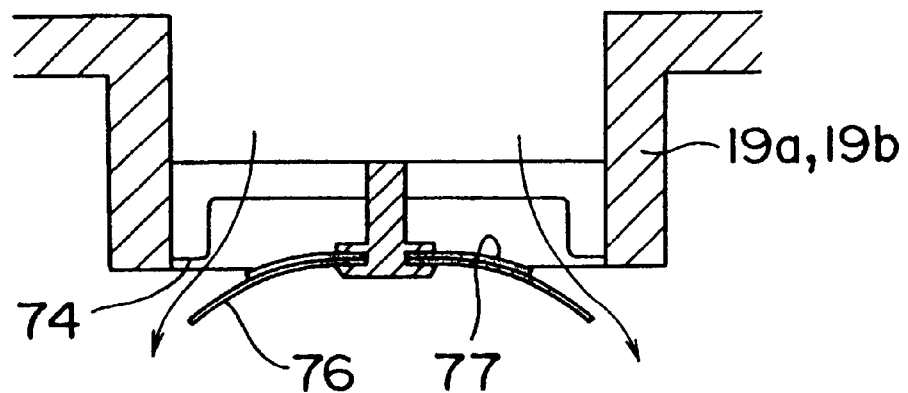
FIG. 13 is a sectional view showing a valve opening state of the throttle valve mechanism shown in FIG. 10.

FIGS. 10 to 14 show a third embodiment of a master cylinder in accordance with the present invention. In this embodiment, a throttle valve mechanism with double valve sheets is used in place of the floating throttle valve mechanism 43, serving as a throttle valve mechanism, described in the first embodiment. FIG. 10 is an enlarged sectional view showing a valve closing state of the throttle valve mechanism with double valve sheets of a master cylinder, FIG. 11 is a bottom view of the throttle valve mechanism shown in FIG. 10, and FIG. 12 is an enlarged sectional view of portion A of FIG. 10. FIG. 13 is a sectional view showing a valve opening state of the throttle valve mechanism shown in FIG.

Figure 14:
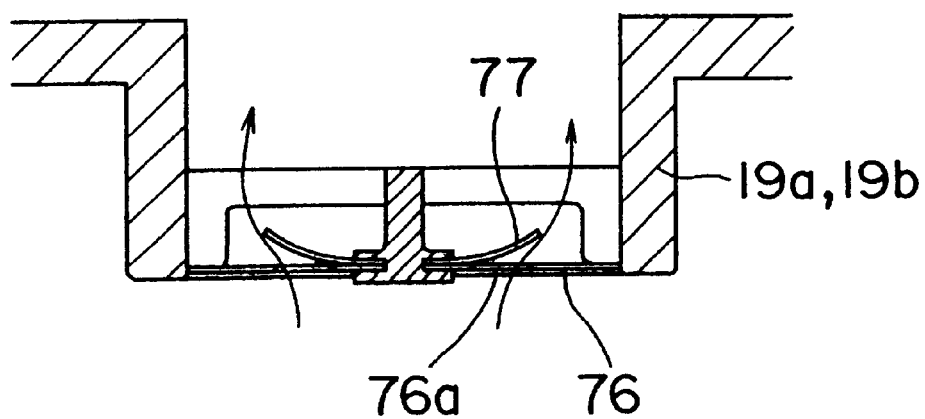
FIG. 14 is a sectional view showing a state in which a valve is opened by a working fluid in the throttle valve mechanism shown in FIG. 10.

10, and FIG. 14 is a sectional view showing a state in which a valve is opened by a working fluid in the throttle valve mechanism shown in FIG. 10.

The throttle valve mechanism with double valve sheets shown in this embodiment can be used for both a center valve type master cylinder and a plunger type master cylinder.

As shown in FIGS. 10 to 12, this throttle valve mechanism 73 with double valve sheets is made up of a thin-sheet or thin-film large-diameter valve sheet 76 and a thin-sheet or thin-film small-diameter valve sheet 77 each formed of an elastically deformable elastic material, for example, a synthetic resin material, ribs 75 each having a valve seat 74 with which the large-diameter valve sheet 76 is brought into contact from the pressure delivering chamber 29, 30 side by interposing the small-diameter valve sheet 77 therebetween while the large- and small-diameter valve sheets 76 and 77 are lapped on each other concentrically, the valve seat 74 being formed at the tip end of the connector 19a, 19b of the reservoir 19 with the cylinder body 21, and a fixing portion 78 for fixing the central portions of the valve sheets 76 and 77 at a central portion 75a of the ribs 75.

In a portion in which the small-diameter valve sheet 77 laps over the large-diameter valve sheet 76, a plurality of through holes 76a is formed as relief ports. In the normal state in which the large-diameter valve sheet 76 is not deformed, a slit 79 for throttling is formed between the outer peripheral edge of the large-diameter valve sheet 76 and the inner peripheral face of tip end of the connector 19a, 19b of the reservoir 19.

Usually, the throttle valve mechanism 73 with double valve sheets 76, 77 is disposed in the fluid passage in each of the connector receiving portions 41 and 42 of the cylinder body 21 of the master cylinder 20, in which the connectors 19a and 19b of the reservoir 19 are fitted, respectively. However, the configuration is not limited to this if the throttle valve mechanism 73 with double valve sheets 76, 77 is disposed in a working fluid resupply passage running from the pressure delivering chambers 29 and 30 to the reservoir 19.

At the time of operation start of the master cylinder 20, when a working fluid flows from the downside to the upside in FIG. 6, that is, from the compression chamber 29, 30 to the reservoir 19, the large-diameter valve sheet 76 is brought into contact with the valve seat 74 by the flow of working fluid, so that the working fluid sent from the pressure chamber 29, 30 flows to the reservoir 19 passing through only the slit 79 for throttling formed between the outer peripheral edge of the large-diameter valve sheet 76 and the inner peripheral face of tip end of the connector 19a, 19b of the reservoir 19 (at this time, the through holes 76a serving as relief ports are closed). Therefore, the quantity of working fluid flowing from the pressure chamber 29, 30 to the reservoir 19 can be decreased.

Inversely, when the working fluid flows from the upside to the downside as shown in FIG. 13, that is, from the reservoir 19 to the pressure chamber 29, 30, the large-diameter valve sheet 76 is separated from the valve seat 74 by the flow of working fluid, and is elastically deformed toward the pressure chamber 29, 30. On the outside of the large-diameter valve sheet 76, the working fluid sent from the reservoir 19 flows to the pressure chamber 29, 30 passing through an expanded passage between the valve seat 74 and the large-diameter valve sheet 76. Therefore, when the master cylinder 20 is returned, the working fluid in the reservoir 19 can be resupplied to the pressure chamber 29, 30 without resistance (with small resistance).

As shown in FIG. 14, when the quantity of working fluid returned from the downside to the upside, that is, from the pressure chamber 29, 30 of the master cylinder 20 to the reservoir 19 is large as in the case where the traction control unit, the automobile stability control unit, etc. are released, the small-diameter valve sheet 76 is elastically deformed toward the reservoir 19, and thus the through holes 76a serving as relief ports formed in the large-diameter valve sheet 76 are opened. As a result, the passage is expanded. Therefore, the working fluid is returned to the reservoir 19 without resistance (with small resistance).

Figure 15:
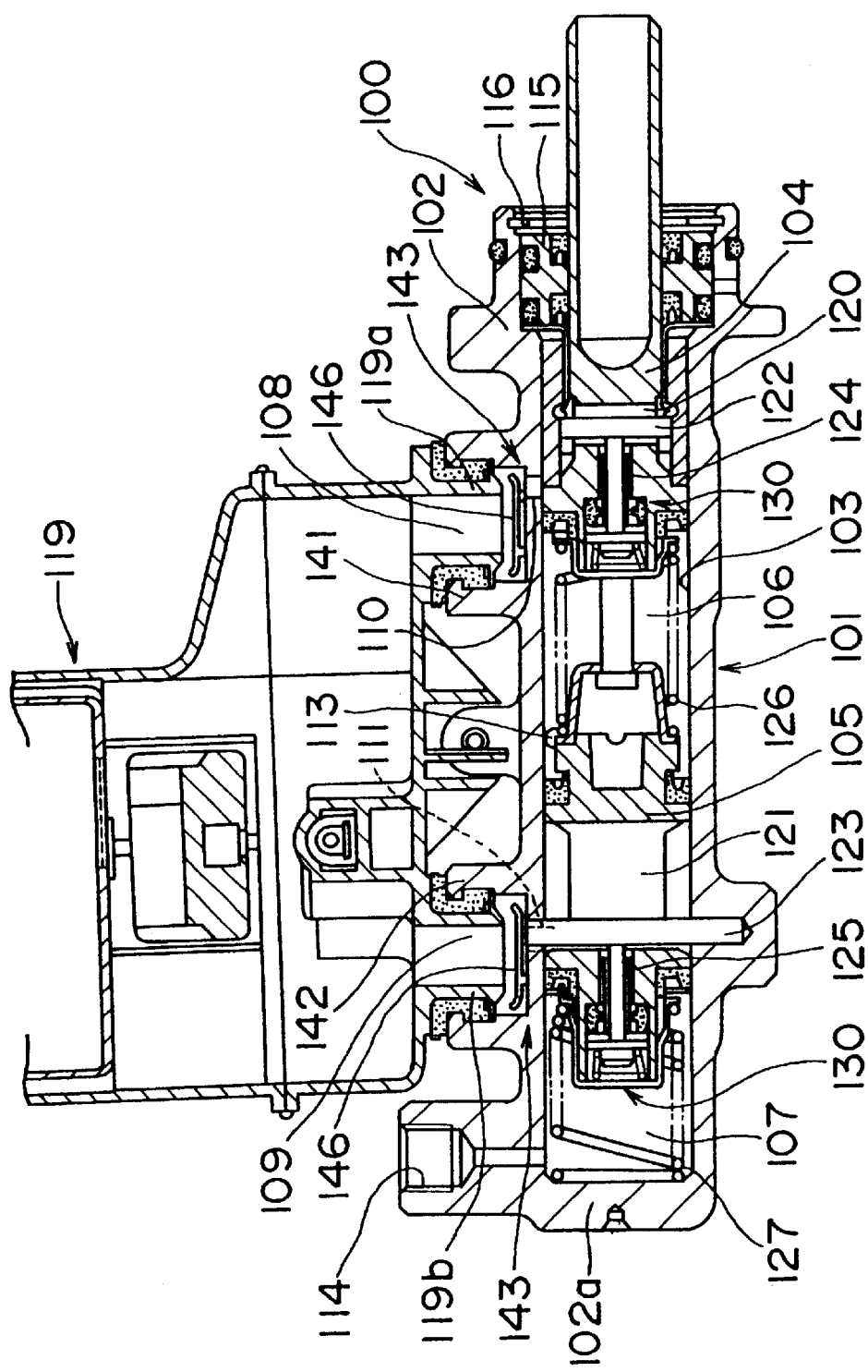
FIG. 15 is a longitudinal sectional view of a master cylinder and a reservoir, showing a fourth embodiment of a master cylinder in accordance with the present invention.
Figure 16:
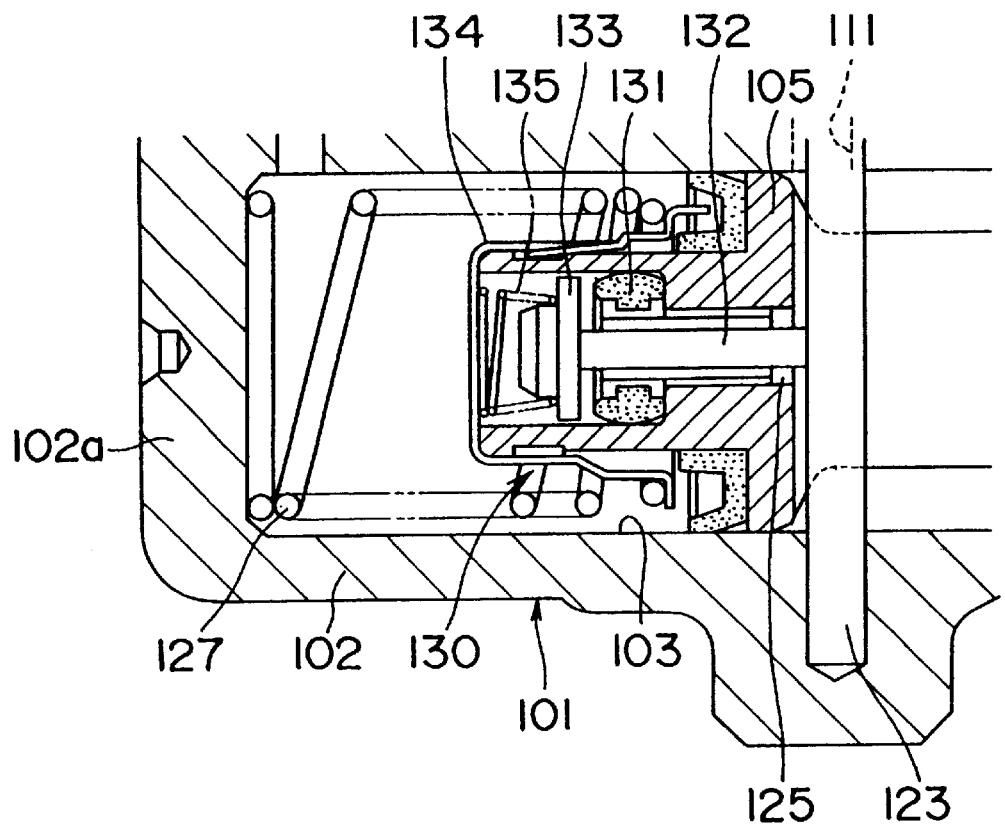
FIG. 16 is an enlarged sectional view of a center valve in the master cylinder shown in FIG. 15.
Figure 17:
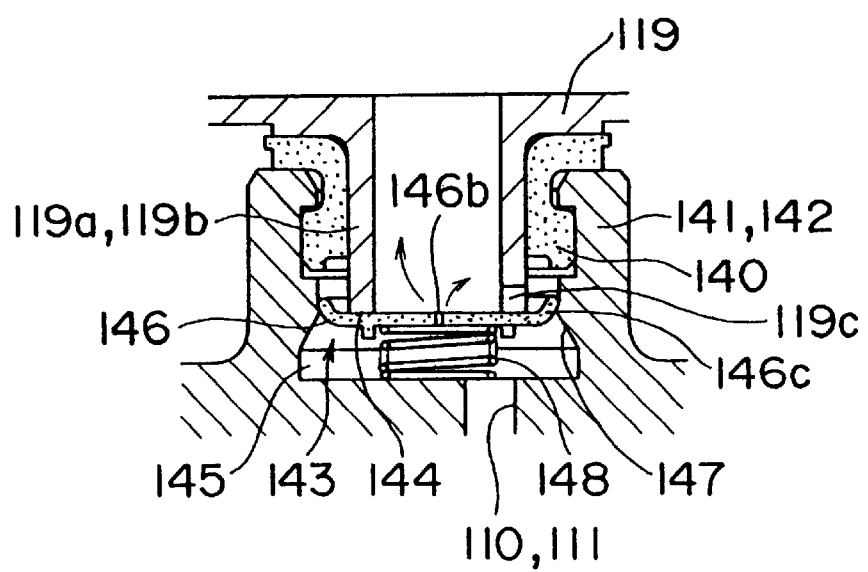
FIG. 17 is an enlarged sectional view showing a valve closing state of a throttle valve mechanism provided in a portion in which a cylinder body and a reservoir are connected to each other in the master cylinder shown in FIG. 15.
Figure 18:
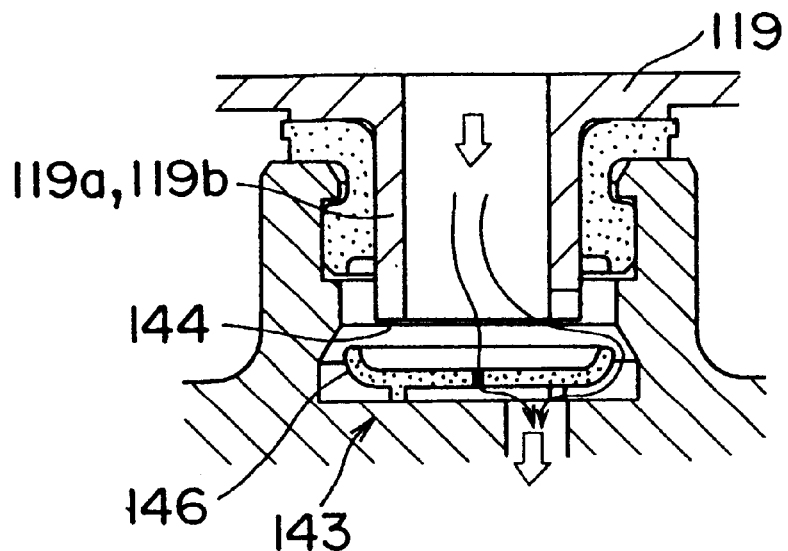
FIG. 18 is a sectional view showing a valve opening state of the throttle valve mechanism shown in FIG. 15.
Figure 19:
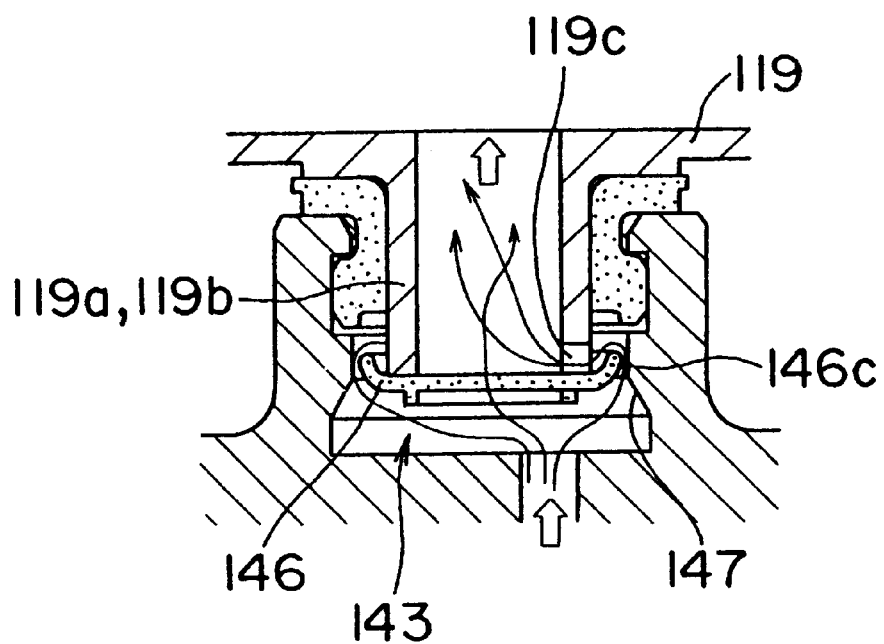
FIG. 19 is a sectional view showing a state in which a valve is opened by a working fluid in the throttle valve mechanism shown in FIG. 15.
Figure 20:
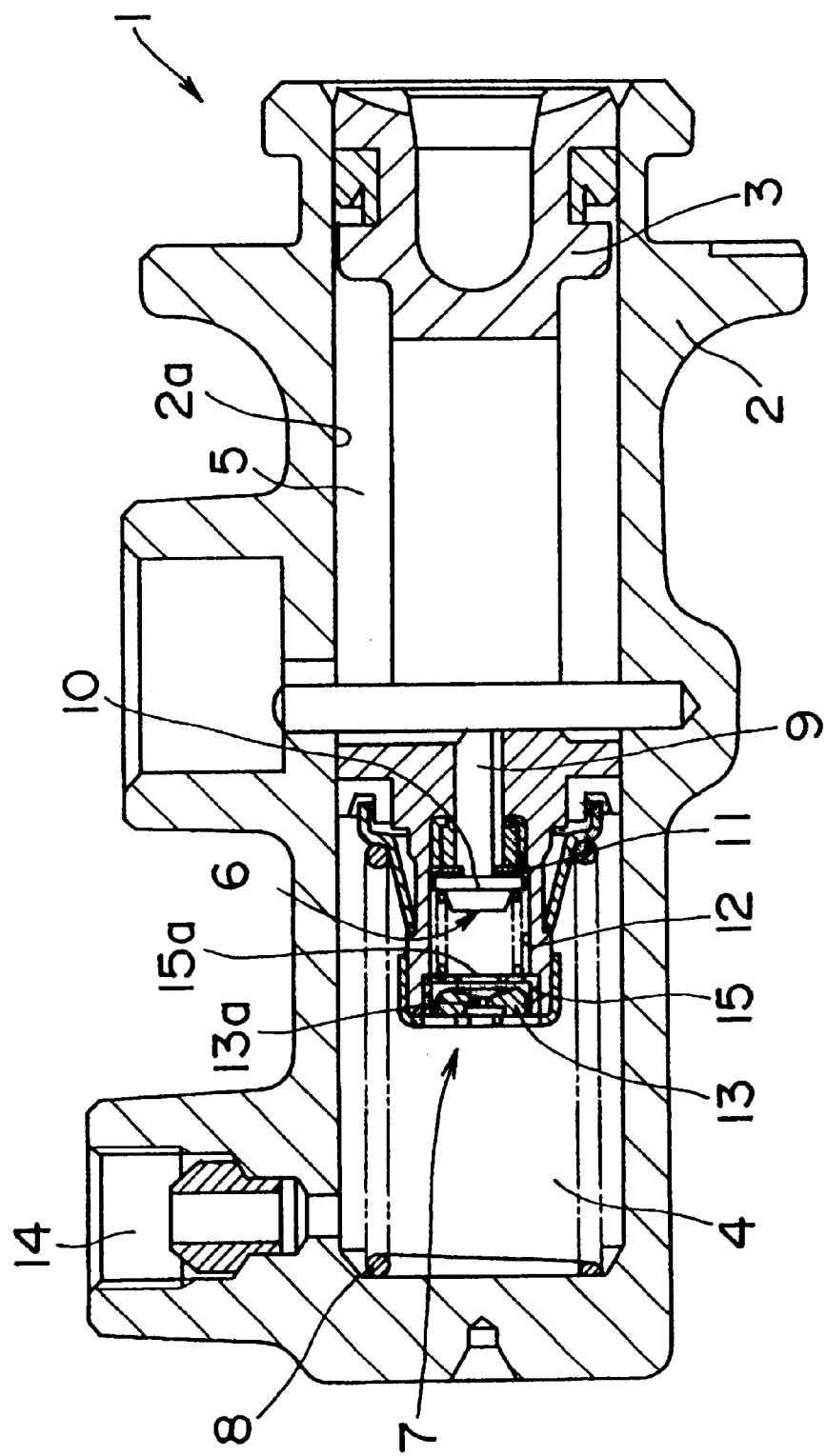
FIG. 20 is a longitudinal sectional view of a conventional master cylinder.

FIGS. 15 to 19 show a fourth embodiment of a master cylinder in accordance with the present invention. FIG. 15 is a longitudinal sectional view of the master cylinder and a reservoir, FIG. 16 is an enlarged sectional view of a center valve in the master cylinder shown in FIG. 15, and FIG. 17 is an enlarged sectional view showing a valve closing state of a throttle valve mechanism provided in a portion in which a cylinder body and the reservoir are connected to each other in the master cylinder shown in FIG. 15. FIG. 18 is a sectional view showing a valve opening state of the throttle valve mechanism shown in FIG. 15, and FIG. 19 is a sectional view showing a state in which a valve is opened by a working fluid in the throttle valve mechanism shown in FIG. 15.

The throttle valve mechanism shown in this embodiment can be used for both a center valve type master cylinder and a plunger type master cylinder.

Referring to FIGS. 15 to 17, this master cylinder 100 has a primary piston 104 and a secondary piston 105 which are inserted slidably in a cylinder bore 103 formed in a cylinder element 102 of a cylinder body 101, and a primary pressure chamber 106 is defined between the primary piston 104 and the secondary piston 105, and a secondary pressure chamber 107 is defined on the outer end side of the secondary piston 105.

In the master cylinder 100, floating throttle valve mechanisms 143, 143 each having a floating valve disc 146, which is seated to throttle the flow of working fluid from the pressure chamber 106 to a reservoir 119 at the operation time of the piston 104 and is opened at the inoperative time of the piston 104, are disposed in make-up fluid passages 108 and 109. The floating throttle valve mechanism 143, 143 has a floating valve disc 146 formed of an elastic material, for example, a synthetic rubber based material having a throttle hole 146b in the center thereof (see FIG. 17) and a valve seat 144 with which and from which the floating valve disc 146 comes into contact and separates. The valve disc 144 is formed at the tip end of a connector 119a, 119b of the reservoir 119 with the cylinder body 101.

The cylinder body 101 is provided integrally with two cylindrical connector receiving portions 141 and 142 projecting upward from the cylinder element 102 and an end wall 102a for closing the end of the cylinder bore 103, and also is provided with output ports 113 and 114 corresponding to the pressure chambers 106 and 107, respectively. A plug 115 is fitted on the opened one end of the cylinder bore 103 in a fluid-tight manner, and is prevented from coming off by using a snap ring 116. The connectors 119a and 119b of the reservoir 119 are fitted in the connector receiving portions 141 and 142, respectively, via a sealing member 140. Also, the cylinder body 101 is provided with fluid passages 110 and 111 running in the radial direction, which open on the inside faces of peripheral walls of the corresponding pressure chambers 106 and 107 and communicate with the connectors 119a and 119b of the reservoir 119.

The primary piston 104 and the secondary piston 105 have slits 120 and 121 provided in the axial direction, respectively, and pins 122 and 123 fixed to the cylinder body 101 in the radial direction are provided in the slits 120 and 121, respectively. Fluid passages 124 and 125 are opened in the center of the tip end in front of the slits 120 and 121, respectively. Also, the primary piston 104 and the secondary piston 105 are urged toward the inoperative position (in the right-hand direction in FIG. 15) by a return spring 126 disposed between the two pistons and by a return spring 127 disposed between the secondary piston 106 and an end wall 102a of the cylinder body 101, respectively.

Center valves 130 are provided at the tip ends of the pistons 104 and 105. These center valves 130 are the same for the pistons 104 and 105, so that only one center valve will be explained. As shown in FIG. 16, the center valve 130 includes an annular valve seat member 131, which is formed of an elastic material and is fitted in the piston 105, a flange-shaped valve disc 133 provided integrally with a rod 132, and a conical spring 135 disposed between a retainer 134 fixed at the tip end of the piston 105 and the flange-shaped valve disc 133. The conical spring 135 urges the flange-shaped valve disc 133 in the direction such that the flange-shaped valve disc 133 is seated against the valve seat member 131. For the flange-shaped valve disc 133, the rod 132 passes through the valve seat member 131 and the fluid passage 125, and the rear end of the rod 132 comes into contact with and separates from the pin 123.

The primary pressure chamber 106 can communicate with the reservoir 119 via the fluid passage 124 at the tip end of the piston 104, the fluid passage 110 formed in the cylinder body 101, the floating valve mechanism 143, and the connector 119a of the reservoir 119. The secondary pressure chamber 107 can communicate with the reservoir 119 via the fluid passage 125 at the tip end of the piston 105, the fluid passage 111 formed in the cylinder body 101, the floating valve mechanism 143, and the connector 119b. The pressure chambers 106 and 107 can communicate with wheel cylinders for front and rear wheels, not shown, via the output ports 113 and 114 formed in the cylinder element 102, respectively.

As shown in FIG. 17, the floating throttle valve mechanism 143, 143 is provided with a valve seat 144 formed at the tip end of the connector 119a, 119b and a valve chest 145 defined in the connector receiving portion 141, 142 by the connector 119a, 119b, and is configured so as to house a floating valve disc 146 in the valve chest 145.

Usually, the floating throttle valve mechanism 143 is disposed in the fluid passage in the connector receiving portion 141, 142 of the cylinder body 101 of the master cylinder 100, in which the connector 119a, 119b of the reservoir 119 is fitted. However, the configuration is not limited to this if the throttle valve mechanism 143 is disposed in a working fluid resupply passage running from the pressure delivering chambers 106 and 107 to the reservoir 119.

The floating valve disc 146 is a disc-shaped valve disc which is formed of an elastic material, for example, a synthetic rubber based material, has a throttle hole 146b in the center thereof, and has an outside diameter larger than the outside diameter of the tip end portion of the connector 119a, 119b. The floating valve disc 146 has a valve element 146c formed upward slantwise along the outer periphery thereof. The floating valve disc 146 floating in the valve axis direction comes into contact with the tip end portion of the connector 119a, 119b, and the connector 119a, 119b has a through groove 119c in the radial direction at the tip end thereof. A seat face 147 is formed on the inner peripheral face of the valve chest 145 between the tip end of the connector 119a, 119b of the reservoir 119 with the cylinder body 101 and the cylinder body side of the connector so that when the floating valve body 146 moves toward the reservoir 119, the valve element 146c comes into contact with the seat face 147 to close the valve, and when the floating valve disc 146 moves toward the cylinder body 101, the valve is opened.

At the time of operation start of the master cylinder 100, when a working fluid flows from the downside to the upside in FIG. 17, that is, from the compression chamber 106, 107 to the reservoir 119, the floating valve disc 146 is made to float by the flow of working fluid and comes into contact with the valve seat 144, the floating throttle valve mechanism 143 becoming in a valve closing state, so that the working fluid flows upward through the throttle hole 146b only. Therefore, at the time of operation start, the quantity of working fluid flowing from the pressure chamber 106, 107 to the reservoir 119 can be decreased.

Inversely, when the working fluid flows from the upside to the downside as shown in FIG. 18, that is, from the reservoir 119 to the pressure chamber 106, 107, the floating valve disc 146 is lowered by the flow of working fluid and the gravity and thus separates from the valve seat 144, and also the valve element 146c of the floating valve disc 146 is separated from the seat face 147 by an inclined angle formed on the seat face 147, the floating throttle valve mechanism 143 becoming in a valve opening state, so that the working fluid in the reservoir 119 flows downward to the pressure chamber 106, 107 passing through a space on the outside of the floating valve disc 146 between the valve seat 144 and the floating valve disc 146. Therefore, when the master cylinder 100 returns, the working fluid in the reservoir 119 can be resupplied to the pressure chamber 106, 107 without resistance (with small resistance).

As shown in FIG. 19, when the quantity of working fluid returned from the downside to the upside, that is, from the pressure chamber 106, 107 of the master cylinder 100 to the reservoir 119 is large as in the case where the traction control unit, the automobile stability control unit, etc. are released, although the floating throttle valve mechanism 143 is made in a valve closing state as described above by the great flow of the working fluid, the valve element 146c of the valve disc 146 is bent and separated from the seat face 147 (elastically deformed) by a pressing force of the flow of working fluid, so that the working fluid flows upward through the through groove 119c provided in the tip end portion of the connector 119a, 119b while expanding the passage. Therefore, the working fluid is returned to the reservoir 119 without resistance (with small resistance).

The floating valve disc 146 may be configured so that a small urging force is applied upward by a compression spring 148 as shown in FIG. 17.

The art of the present invention is not limited to the art described in the above-described embodiments, and means of another mode having the same function may be used. Also, the art of the present invention can be changed and added variously without departing from the spirit and scope of the invention.

As is apparent from the above description, according to the master cylinder in accordance with the present invention, the throttle valve mechanism having a throttle function of throttling the flow of working fluid from the pressure delivering chamber to the reservoir at the operation time of the piston, a valve function of allowing the working fluid to flow from the reservoir to the pressure delivering chamber by opening the valve at the return time of the piston, and a relief valve function of allowing a large quantity of working fluid to flow from the pressure delivering chamber to the reservoir is disposed in the fluid passage. Therefore, even on an automobile provided with a traction control unit and an automobile stability control unit, there can be provided a simple and small valve construction which can decrease the quantity of working fluid flowing to the reservoir at the time of operation start of master cylinder, and can respond to the fluctuations in fluid pressure quickly when the traction control unit and the automobile stability control unit are released. At the same time, the noneffective piston stroke of the master cylinder can be decreased.

What is claimed is:

1. A master cylinder comprising:

a cylinder body;

a piston disposed slidably in a cylinder bore formed in said cylinder body;

a pressure delivering chamber defined by said piston and said cylinder body;

a fluid passage connecting said pressure delivering chamber to a reservoir for resupplying a working fluid to said pressure delivering chamber;

an output port connecting said pressure delivery chamber and said fluid passage for discharging a working fluid pressurized at the operation time of said piston from said pressure delivery chamber; and a throttle valve mechanism disposed in said fluid passage and having a throttle function of throttling the flow of a working fluid from said pressure delivering chamber to said reservoir at the operation time of said piston, a valve function of allowing the working fluid to flow from said reservoir to said pressure delivering chamber by opening the valve at the return time of said piston, and a relief valve function of allowing the working fluid to flow from said pressure delivering chamber to said reservoir.

2. The master cylinder according to claim 1, further comprising a connector disposed within said reservoir, wherein said throttle valve mechanism comprises a valve seat provided at a tip end of said connector, and a floating valve disc formed of an elastic material formed with a throttle hole and a plurality of slits in a substantially central portion thereof, said floating valve disc further comprising a valve seat face which is capable of being seated against said valve seat.

3. The master cylinder according to claim 1, further comprising a connector disposed within said reservoir, wherein said throttle valve mechanism comprises a thin-sheet or thin-film valve sheet formed of an elastic material, a rib formed at a tip end of said connector, with which said valve sheet comes into contact from the pressure delivering chamber side, and a fixing portion for fixing said valve sheet, and in the normal state in which said valve sheet is not deformed, a slit for throttling formed between the outer peripheral edge of said valve sheet and the inner peripheral face of tip end of the connector.

4. The master cylinder according to claim 1, further comprising a connector disposed within said reservoir, wherein said throttle valve mechanism comprises two large-diameter and small-diameter thin-sheet or thin film valve sheets, each formed of an elastic material, a rib formed at a tip end of said connector, with which said large-diameter valve sheet comes into contact from the pressure delivering chamber side with said small-diameter valve sheet being interposed between said rib and said large-diameter valve sheet, and a fixing portion for fixing both of said valve sheets in a substantially central portion of said rib; a through hole formed in a portion in which said small-diameter valve sheet laps over said large-diameter valve sheet; and in the normal state in which said large-diameter valve sheet is not deformed, a slit for throttling formed between the outer peripheral edge of said large-diameter valve sheet and the inner peripheral face of tip end of said connector.

5. The master cylinder according to claim 1, further comprising:

a connector disposed within said reservoir; and a valve chest comprising a passage between a tip end of said connector and said cylinder body side of said connector;

wherein said throttle valve mechanism comprises a floating valve disc formed of an elastic material formed with a throttle hole, and a sheet face formed on the inner peripheral face of said valve chest so as to be inclined with respect to the valve axis, said connector having a through groove in the tip end thereof and being formed with a valve seat with which said floating valve disc floating in the valve axis direction comes into contact, so that when said floating valve disc moves toward said reservoir, the valve is closed, and when said floating valve disc moves toward said cylinder body, the valve is opened.

* * * * *